US010669380B2

(12) United States Patent
Tuerk et al.

(10) Patent No.: US 10,669,380 B2
(45) Date of Patent: Jun. 2, 2020

(54) AMPHIPHILIC STAR-LIKE POLYETHER

(71) Applicants: BASF SE, Ludwigshafen (DE); HENKEL AG & CO. KGAA, Duesseldorf (DE)

(72) Inventors: Holger Tuerk, Mannheim (DE); Eva-Maria Reis-Walther, Breuberg (DE); Sophie Maitro-Vogel, Mannheim (DE); Anna Mueller-Cristadoro, Waldems (DE); Catherine Breffa, Mannheim (DE); Alejandra Garcia Marcos, Ludwigshafen (DE); Benedikt Crone, Mannheim (BE); Mareile Job, Leverkusen (DE); Birgit Gluesen, Duesseldorf (DE); Iwona Spill, Duesseldorf (DE)

(73) Assignees: BASF SE, Ludwigshafen (DE); HENKEL AG & CO. KGAA, Duesseldorf (DE)

( * ) Notice: Subject to any disclaimer, the term of this patent is extended or adjusted under 35 U.S.C. 154(b) by 117 days.

(21) Appl. No.: 15/329,158

(22) PCT Filed: Jul. 22, 2015

(86) PCT No.: PCT/EP2015/066751
§ 371 (c)(1),
(2) Date: Jan. 25, 2017

(87) PCT Pub. No.: WO2016/016061
PCT Pub. Date: Feb. 4, 2016

(65) Prior Publication Data
US 2017/0218134 A1 Aug. 3, 2017

(30) Foreign Application Priority Data
Jul. 30, 2014 (EP) .................................. 14179110

(51) Int. Cl.
*C11D 3/37* (2006.01)
*C08G 65/26* (2006.01)
*C08G 83/00* (2006.01)
*C11D 3/00* (2006.01)
*C11D 11/00* (2006.01)

(52) U.S. Cl.
CPC ....... *C08G 83/005* (2013.01); *C08G 65/2606* (2013.01); *C08G 65/2609* (2013.01); *C08G 65/2696* (2013.01); *C08G 83/002* (2013.01); *C08G 83/006* (2013.01); *C11D 3/0036* (2013.01); *C11D 3/3707* (2013.01); *C11D 11/0017* (2013.01); *C08G 2650/32* (2013.01)

(58) Field of Classification Search
CPC ......... C11D 3/37; C11D 3/3707; C11D 3/378; C08G 65/26; C08G 83/00
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Robert |
| 3,278,459 A | 10/1966 | Robert |
| 3,427,256 A | 2/1969 | Milgrom |
| 3,427,334 A | 2/1969 | Belner |
| 3,427,335 A | 2/1969 | Robert |
| 5,470,813 A | 11/1995 | Bi |
| 5,482,908 A | 1/1996 | Bi |
| 2012/0294813 A1 | 11/2012 | Frey et al. |

FOREIGN PATENT DOCUMENTS

| | | | |
|---|---|---|---|
| EP | 116978 | * 2/1984 | ............. C08G 65/08 |
| EP | 0 116 978 A2 | 8/1984 | |
| EP | 116978 | * 8/1984 | ............. C08G 65/08 |
| EP | 2 245 082 A1 | 11/2010 | |
| EP | 2 678 372 A1 | 1/2014 | |
| WO | 2004/074346 A1 | 9/2004 | |

(Continued)

OTHER PUBLICATIONS

European Search Report issued in European Application No. 14 17 9110 dated Sep. 16, 2014.
Knischka, Ralf et al., "Functional Poly(ethylene oxide) Multiarm Star Polymers: Core-First Synthesis Using Hyperbranched Polyglycerol Initiators," Macromolecules, American Chemical Society, US, vol. 33, No. 2, Jan. 1, 2000.
Flory, Paul J., "Molecular Size Distribution in Three Dimensional Polymers. VI. Branched Polymers Containing A-R-B f-1 Type Units," American Chem., vol. 74, Nov. 9, 1951.
D. Holter et al., "Degree of branching in hyperbrached polymers," Acta Polymer, vol. 48, 30-35 (1997).

(Continued)

*Primary Examiner* — Brian P Mruk
(74) *Attorney, Agent, or Firm* — Armstrong Teasdale LLP

(57) ABSTRACT

The present invention relates to amphiphilic star-like polyether. The core molecule is an aliphatic hyperbranched polyether polyol, which is further alkoxylated, first with ethylene oxide or combinations of ethylene oxide and $C_3$-$C_{20}$ alkylene oxide, preferably propylene oxide, and/or glycidol, and then with a $C_3$-$C_{20}$ alkylene oxide, preferably propylene oxide, or combination of ethylene oxide and propylene oxide, then optionally anionically modified. The resulting amphiphilic star-like polyether thus has an inner core based on an aliphatic hyperbranched polyether polyol, an inner shell predominantly containing polyethylene oxide units, the inner shell comprising at least 3 ethylene oxide units and an outer shell predominantly containing polypropylene oxide units, the outer shell comprising at least 3 propylene oxide units. They optionally contain anionic groups instead of hydroxyl groups on the periphery of the macromolecule. The invention further relates to their use as additive in laundry formulations and to their manufacturing process.

17 Claims, No Drawings

(56) References Cited

FOREIGN PATENT DOCUMENTS

| WO | 2009/060059 A1 | 5/2009 |
| WO | 2009/101141 A1 | 8/2009 |
| WO | 2012/113616 A1 | 8/2012 |
| WO | 2012/113618 A1 | 8/2012 |
| WO | 2014131584 A2 | 9/2014 |
| WO | 2015197378 A1 | 12/2015 |
| WO | 2015197379 A1 | 12/2015 |

OTHER PUBLICATIONS

Frey, H., et al., "Controlling the Growth of Polymer Trees: Concepts and Perspectives for Hyperbranched Polymers," Chem. Eur. J. 2000, 6, No. 14.

International Search Report issued in International Application No. PCT/EP2015/066751 dated Sep. 21, 2015.

* cited by examiner

AMPHIPHILIC STAR-LIKE POLYETHER

CROSS-REFERENCE TO RELATED APPLICATIONS

This application is a U.S. National Phase Application of PCT/EP2015/066751, filed Jul. 22, 2015, which claims the benefit of priority to EP Application No. 14179110.3, filed Jul. 30, 2014, the contents of which are hereby expressly incorporated by reference in their entirety.

The present invention relates to amphiphilic star-like polyether. The core molecule is an aliphatic hyperbranched polyether polyol, which is further alkoxylated, first with ethylene oxide or combinations of ethylene oxide and $C_3$-$C_{20}$ alkylene oxide, preferably propylene oxide, and/or glycidol, and then with a $C_3$-$C_{20}$ alkylene oxide, preferably propylene oxide, or combination of ethylene oxide and propylene oxide, then optionally anionically modified. The resulting amphiphilic star-like polyether thus has an inner core based on an aliphatic hyperbranched polyether polyol, an inner shell predominantly containing polyethylene oxide units, the inner shell comprising at least 3 ethylene oxide units and an outer shell predominantly containing polypropylene oxide units, the outer shell comprising at least 3 propylene oxide units. They optionally contain anionic groups instead of hydroxyl groups on the periphery of the macromolecule. The invention further relates to their use as additive in laundry formulations and to their manufacturing process.

In addition to surfactants, polymers are used as soil detachment-promoting additives for laundry detergents and cleaning compositions. However, in the absence of a suitable dispersant, hydrophobic (e.g. grime, oil, soot) and hydrophilic (e.g. clay) soil which is removed during the washing step of the laundry process can re-deposit onto the cleaned fabric. Soil dispersants act by sequestering dirt once it is dissolved or dispersed in the laundry liquor where it can be carried away during the normal rinsing process. This secondary detergency effect correlates to the degree of greying or incrustation of fabrics, detectable after repetition of several washing cycles. Certain polymers are very useful for the improvement of secondary detergency. The well-known CMC (carboxymethylcellulose) is used in almost all standard powder detergents to improve the secondary detergency. However, CMC is not compatible with typical liquid detergent matrices, due to its limited solubility. The incorporation of CMC in liquid detergents leads to precipitation and phase separation. In addition, CMC leads to an increase of the viscosity of liquid detergent formulations. Alkoxylated PEI molecules described in WO2009/060059A1 already show very good anti-redeposition properties (e.g. for soot or clay), also on cotton fabrics. However, such polymers and also all other materials described in the literature could not yet achieve the anti-greying performance of CMC.

Hence, there is still a need for highly effective soil dispersants which exhibit good anti-redeposition (e.g. antigreying) properties, especially for hydrophobic soil types (oil, fat, soot), on all kinds of fabrics, particularly on cotton fabrics and which can be easily incorporated in liquid laundry detergent compositions.

WO 2009/101141 A1 reads on highly functional hyperbranched polyetherols obtained by acid catalyzed polycondensation of at least one trifunctional or higher-functionality alcohol with, if appropriate, further mono- and/or difunctional alcohols. These hyperbranched polyetherols find an application as adhesion promoter, rheology modifier and as additives in printing inks.

WO2004/074346 A1 discloses the preparation of polyether based on glycerol with catalysis by strong alkalis and their further modification with monofunctional alcohols. The obtained products have a hydroxyl number of 400 to 1000 mg KOH/g.

WO 2012/113616 A1 reads on polymers prepared by the polymerisation of a) an alkylene oxide or a cyclic carbonate with b) glycerol carbonate. Preferably the alkylene oxide is ethylene oxide and/or propylene oxide.

WO 2012/113618 A1 describes polymers prepared by the polymerisation of a) an alkylene oxide or a cyclic carbonate with b) glycerol carbonate and c) an alcohol. Preferably the alkylene oxide is ethylene oxide and/or propylene oxide. The alcohol comprises one hydroxyl group but alcohols with two or more hydroxyl groups can optionally be used.

Knischka et al. (Macromolecules, 2000, 33, 315-320) discloses multi-arm star polymers where the core-molecule is a hyperbranched polyglycerol modified with polypropylene oxide. The modified core-molecule is further modified with ethylene oxide. Therefore, hyperbranched polyglycerol with PO in the inner shell and EO in the outer shell is described. However, the inverse structure (EO in the inner shell, PO in the outer shell) is not mentioned at all.

It was therefore an object of the present invention to provide amphiphilic star-like polyether based on an aliphatic hyperbranched polyether polyol that has beneficial properties for the use as additives for laundry detergents, especially for hydrophobic soil cleaning and whiteness maintenance. These new polymers should be suitable for cleaning compositions for preventing the suspended and emulsified greasy soil from re-deposition to surfaces of textiles, especially from re-deposition to cotton fabrics. Furthermore, they should be compatible with liquid detergent matrices, in order to obtain clear and transparent formulations, and they should be stable in the formulations and not cause undesired increase of viscosity.

It was found that the inventive amphiphilic star-like polyether based on an aliphatic hyperbranched polyether polyol could solve this problem.

The amphiphilic star-like polyether is obtainable by
i) step i: preparation of an aliphatic hyperbranched polyether polyol (core compound A) either by
 a) reacting an aliphatic alcohol $\alpha$ with the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$ with itself and/or optionally with a di-, tri-, tetra- or higher functional aliphatic alcohol $\beta$ with the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$, in the presence of a catalyst, and removing the water formed during the reaction (polycondensation approach i)a))
 or
 b) reacting an aliphatic alcohol $\omega$ with the general formula $[C_nH_{(2n+2)-x}OH_x][EO]_y[PO]_z$, wherein $1 \leq x \leq 6$, $0 \leq y \leq 20$, $0 \leq z \leq 20$ and $1 \leq n \leq 10$ with at least one cyclic carbonate based on an aliphatic polyol with the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$, in the presence of a base as catalyst, and removing the carbon dioxide formed during the reaction (ring-opening polycondensation approach i)b))
 or
 c) reacting an aliphatic alcohol $\omega$ with the general formula $[C_nH_{(2n+2)-x}OH_x][EO]_y[PO]_z$, wherein $1 \leq x \leq 6$, $0 \leq y \leq 20$, $0 \leq z \leq 20$ and $1 \leq n \leq 10$ with at least one epoxide based on an aliphatic polyol with the general formula $[C_nH_{(2n+2)-x}OH_x][EO]_y[PO]_z$, wherein $3 \leq x \leq 6$, $0 \leq y \leq 20$, $0 \leq z \leq 20$ and $3 \leq n \leq 10$, in the presence of either a base or an acid as catalyst (ring-opening polyaddition approach i)c)), ii) step ii: reacting core compound A with ethylene oxide, or with ethylene oxide and glycidol, or with ethylene oxide and $C_3$-$C_{20}$ alkylene oxide, or with ethylene oxide, glycidol and $C_3$-$C_{20}$ alkylene oxide, leading to compound B, iii) step iii: reacting compound B with a $C_3$-$C_{20}$ alkylene oxide or with a mixture of ethylene oxide and a $C_3$-$C_{20}$ alkylene oxide, leading to compound C, iv) optionally, step iv: reacting compound C with modification reagents to convert 5 to 100% of the terminal hydroxyl groups to anionic sulphate, sulfonate, carboxylate, phosphate or phosphonate groups, leading to compound D.

The amphiphilic star-like polyether is an alkoxylated aliphatic hyperbranched polyether polyol, wherein the polyol is the core molecule A on which the alkylene oxide groups are further reacted. By aliphatic hyperbranched polyether polyols for the purpose of this invention are meant hyperbranched polyether having hydroxyl terminations, and are based at least on one aliphatic alcohol with the formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$.

In the context of the present invention, "hyperbranched" is understood to mean that the degree of branching (DB), is from 10 to 99.9%, preferably from 20 to 99% and more preferably 20-95%. In the context of the present invention, "dendrimeric" is understood to mean that the degree of branching is 99.9-100%. For a definition of the degree of branching see H. Frey et al., Acta Polym. 1997, 48, 30. On the one hand hyperbranched polymers may be synthesized starting from a central molecule in the same way as for dendrimers but, in contrast to the latter, with a nonuniform chain length of the branches. Hyperbranched polymers are therefore to be differentiated from dendrimers (U.S. Pat. No. 6,399,048). For the purposes of the present invention, hyperbranched polymers do not comprise dendrimers. On the other hand, the hyperbranched polymers may also be of linear construction, with functional, branched side groups, or else, as a combination of the two extremes, may include linear and branched molecule moieties. For the definition of dendrimers and hyperbranched polymers see also P. J. Flory, J. Am. Chem. Soc. 1952, 74, 2718 and H. Frey et al., Chem. Eur. J. 2000, 6, 2499. In contrast to dendrimers, hyperbranched polymers have a molecular weight distribution and are not as well defined as dendrimers. However, they exhibit similar properties also in the context of this invention and are much easier in their preparation.

Step i) a): Preparation of an Aliphatic Hyperbranched Polyether Polyol (Core Compound A)

The aliphatic alcohol α of step i) a) may, for example be a trialcohol such as glycerol, trimethylolmethane, trimethylolethane, trimethylolpropane (TMP), 1,2,4-butanetriol. It is likewise possible to use tetrols such as bistrimethylolpropane (di-TMP) or pentaerythritol. In addition, it is possible to use a higher-functionality polyol such as bispentaerythritol (di-penta) or inositol. In addition, it is also possible to use alkoxylation products of the aforementioned alcohols, preferably with 1-20 alkylene oxide units per molecule. Particular preference is given to using, as a trifunctional and higher-functionality alcohol, an aliphatic alcohol with primary hydroxyl groups, such as trimethylolmethane, trimethylolethane, trimethylolpropane, glycerol, di-TMP, pentaerythritol, di-pentaerythritol. Preferably, the trifunctional and higher-functionality alcohol do not contain any alkylene oxide units. It is likewise possible to use the alcohols mentioned in a mixture.

The aliphatic alcohol α of step i) a) is preferably selected from the group consisting of glycerol, trimethylolethane, trimethylolpropane, 1,2,4-butanetriol, 1,2,3-hexanetriol, 1,2,4-hexanetriol, pentaerythritol or dipentaerythritol. Even more preferably, the trifunctional and higher-functionality alcohols are trimethylolpropane or pentaerythritol.

The aliphatic alcohol α of the present invention does not contain any heteroatom like N or S, and corresponds to the formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$. Reason for that is that the hyperbranched core molecule for preparation of amphiphilic star-like polyether should provide a rather hydrophobic polyether backbone for best interaction with hydrophobic components, e.g. fatty, soils.

The aliphatic alcohol α of step i) a) can react with itself and/or optionally with a di-, tri-, tetra- or higher functional aliphatic alcohol β. In addition to the at least trifunctional alcohol α, the aliphatic hyperbranched polyether polyol could optionally contain a second di-, tri-, tetra- or higher functional aliphatic alcohol β having the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$. This aliphatic alcohol building block could be a difunctional alcohol. Suitable difunctional alcohols include ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, 1,6-hexanediol, 1,2- or 1,3-cyclopentanediol, 1,2- or 1,3- or 1,4-cyclohexanediol, 1,1-, 1,2-, 1,3- or 1,4-cyclohexanedimethanol, bis(4-hydroxycyclohexyl)methane, bis(4-hydroxycyclohexyl)ethane, 2,2-bis(4-hydroxycyclohexyl) pro-pane, 1,1'-bis(4-hydroxyphenyl)-3,3,5-trimethylcyclohexane, difunctional polyetherpolyols based on ethylene oxide, propylene oxide, butylene oxide or mixtures thereof, polytetrahydrofuran having a molar mass of 162 to 2000. Preferred difunctional alcohols are ethylene glycol, diethylene glycol, triethylene glycol and difunctional polyetherpolyols based on ethylene oxide, propylene oxide, butylene oxide, or mixtures thereof, even more preferred is triethylene glycol.

The specific selection of the reaction conditions, such as pressure and temperature, and the concentration of the starting materials depends on the reactivity of the alcohols. The reaction conditions in the process according to the invention are preferably selected such that the core compound A obtained according to process i) a) has a number-average molecular weight $M_n$ determined by GPC from 400 g/mol to 20000 g/mol and a weight-average molecular weight $M_w$ of from 2000 g/mol to 100000 g/mol. Preferred is $M_w$ from 4000 to 40000 g/mol. The OH number is from 400 to 1000 mg KOH per g of polymer, preferrably from 500 to 850 mg KOH.

When the aliphatic alcohol α of step i) a) reacts with a di-, tri-, tetra- or higher functional aliphatic alcohol β, the amount of aliphatic alcohol β lies in the range of from 0 to 50 mol %, preferably from 20 to 50 mol %, even more preferably 33 to 50 mol % based on the total amount of aliphatic alcohol α and β.

To accelerate the reaction, acidic catalysts or catalyst mixtures are added. Suitable catalysts are, for example, acids with a $pK_a$ of less than 2.2; particular preference is given to strong acids.

Examples of acids with a $pK_a$ of less than 2.2 are, for example, phosphoric acid ($H_3PO_4$), phosphorous acid ($H_3PO_3$), pyrophosphoric acid ($H_4P_2O_7$), polyphosphoric acid, hydrogensulfate ($HSO_4^-$), sulfuric acid ($H_2SO_4$), perchloric acid, hydrochloric acid, hydrobromic acid, chlorosulfonic acid, methanesulfonic acid, trichloromethanesulfonic acid, trifluoromethanesulfonic acid, benzenesulfonic acid or p-toluenesulfonic acid.

Further examples of inventive acidic catalysts are acidic ion exchangers or ion exchange resins. "Ion exchangers" is the collective term for solid substances or liquids which are able to absorb positively or negatively charged ions from an electrolyte solution while releasing equivalent amounts of other ions. Preference is given to using solid grains and particles whose matrix has been obtained by condensation (phenol-formaldehyde) or by polymerization (copolymers of styrene and divinylbenzene, and methacrylates and divinylbenzene).

The acidic ion exchangers used in accordance with the invention bear, for example, sulfonic acid groups, carboxylic acid groups or phosphonic acid groups. It is also possible to use ion exchangers which possess a hydrophilic cellulose structure or consist of crosslinked dextran or agarose, and bear acidic functional groups, for example carboxymethyl or sulfoethyl groups. It is also possible to use inorganic ion exchangers, such as zeolites, montmorillonites, palygorskites, bentonites and other aluminum silicates, zirconium phosphate, titanium tungstate and nickel hexacyanoferrate (II). For ion exchangers, see also RÖMPP, Chemisches Lexikon [Chemical Lexicon], Online Version 3.0, or "Ion Exchangers" by F. De Dardel and T. V. Arden, published in Ullmann's Encyclopedia of Industrial Chemistry, Electronic Release 2007. Acidic ion exchangers are obtainable, for example, in solid or dissolved form under the product names Amberlite™, Ambersept™ or Amberjet™ from Rohm and Haas.

Particular preference is given to phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid or acidic ion exchangers.

Very particular preference is given to methanesulfonic acid, trifluoromethanesulfonic acid, p-toluenesulfonic acid or acidic ion exchangers.

The acid is added as a catalyst generally in an amount of from 50 ppm to 10% by weight, preferably from 100 ppm to 5% by weight and more preferably from 1000 ppm to 3% by weight, based on the amount of the alcohol or alcohol mixture used.

When an acidic ion exchanger is used as a catalyst, an amount of from 1000 ppm to 30% by weight, preferably of 1-25% by weight, more preferably 1-20% by weight, based on the amount of the alcohol or alcohol mixture used, is typically added. It will be appreciated that the catalysts can also be used in a mixture.

Moreover, it is possible both by addition of the suitable catalyst and by selection of a suitable temperature to control the polycondensation reaction. In addition, it is possible via the composition of the starting components and via the residence time to establish the mean molecular weight of the polymer and its structure.

The reaction is effected typically at a temperature of from 0 to 300° C., preferably from 0 to 250° C., more preferably from 60 to 250° C. and most preferably from 80 to 250° C., in bulk or in solution. In general, it is possible to use all solvents which are inert toward the particular reactants. When solvents are used, preference is given to using organic solvents, for example decane, dodecane, benzene, toluene, chlorobenzene, xylene, dimethylformamide, dimethylacetamide or solvent naphtha.

In a particularly preferred embodiment, the condensation reaction is carried out in bulk, i.e. without addition of solvent. The water released in the reaction can be removed from the reaction equilibrium to accelerate the reaction, for example by distillation, if appropriate under reduced pressure.

The inventive high-functionality polyetherpolyols are prepared usually within a pressure range of from 0.1 mbar to 20 bar, preferably from 1 mbar to 5 bar, in reactors which are operated in batchwise operation, semicontinuously or continuously.

Preference is given to performing the reaction in a so-called "one-pot method", in which the monomer is initially charged in its entirety and the reaction is carried out in a backmixed reactor. However, reactions are also conceivable in a multistage reactor system, for example a stirred tank battery or a tubular reactor. In a preferred alternative embodiment of the present invention, the reaction can be carried out in a kneader, extruder, intensive mixer or paddle dryer.

The reaction can, if appropriate, also be carried out with the aid of ultrasound or microwave radiation.

There are various ways of stopping the intermolecular polycondensation reaction. For example, the temperature can be lowered to a range in which the reaction stops and the condensation product is storage-stable.

In addition, the catalyst can be deactivated, for example by adding a basic component such as a Lewis base or an organic or inorganic base.

The aforementioned adjustment of the reaction conditions and if appropriate the selection of a suitable solvent allow the inventive products to be processed further without further purification after the preparation.

In a further preferred embodiment, the reaction product is purified by stripping, i.e. by removing low molecular weight volatile compounds. For this purpose, the catalyst can be deactivated after the desired conversion has been attained. Subsequently, the low molecular weight volatile constituents, for example solvents, starting monomers, volatile cleavage products, volatile oligomeric or cyclic compounds or water are removed by distillation, if appropriate with introduction of a gas, preferably nitrogen, carbon dioxide or air, if appropriate under reduced pressure. In a preferred embodiment, the product is freed of volatile constituents in a thin-film evaporator.

Owing to the properties of the starting monomers, the reaction will result in condensation products with different structures, which have branches and cyclic units but no crosslinks. The number of reactive groups arises from the properties of the monomers used and the degree of polycondensation, which, according to the invention, should be selected such that the gel point is not attained.

Step i) b): Preparation of an Aliphatic Hyperbranched Polyether Polyol (Core Compound A)

The aliphatic alcohol ω of step i) b) may, for example be a monoalcohol such as methanol, ethanol, propanol, butanol, pentanol, hexanol, heptanol, octanol, decanol and their respective isomers. The aliphatic alcohol ω of step i) b) may as well be a dialcohol such as ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, cyclopentanediol, cyclohexanediol, difunctional polyetherpolyols based on ethylene oxide, propylene oxide, butylene oxide or mixtures thereof, or polytetrahydrofuran. It will be appreciated that it is also possible to use the difunctional alcohols in mixtures. The aliphatic alcohol ω of step i) b) may as well be a trialcohol such as glycerol, trimethylolmethane, trimethylolethane, trimethylolpropane (TMP), 1,2,4-butanetriol. It is likewise possible to use tetrols such as bistrimethylolpropane (di-TMP) or pentaerythritol. In addition, it is possible to use a higher-functionality polyol such as bispentaerythritol (di-penta) or inositol. In addition, it is also possible to use alkoxylation products of the aforementioned alcohols, preferably with 1-20 alkylene oxide units per molecule. Particular preference is given to using, as a trifunctional and higher-functionality alcohol, an aliphatic alcohol with primary hydroxyl groups, such as trimethylolmethane, trimethylolethane, trimethylolpropane, glycerol, di-TMP, pentaerythritol, di-penta. Preferably, the trifunctional and higher-functionality alcohol do not contain any alkylene oxide units. It is likewise possible to use the alcohols mentioned in a mixture.

The aliphatic alcohol ω of step i) b) is preferably selected from the group consisting of glycerol, trimethylolethane, trimethylolpropane, 1,2,4-butanetriol, 1,2,3-hexanetriol, 1,2,4-hexanetriol, pentaerythritol or dipentaerythritol. Even more preferably, the trifunctional and higher-functionality alcohols are glycerol or pentaerythritol.

The cyclic carbonate is based on an aliphatic polyol having the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$. The cyclic carbonate can be represented by the structure of formula I

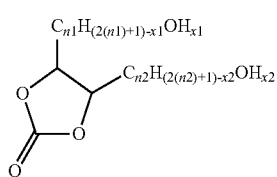

formula I wherein
n1+n2 has a value of from 1 to 8,
x1+x2 has a value of from 1 to 4.

Preferably, n1 is 1, n2 is 0, x1 is 1 and x2 is 0.

The cyclic carbonate is preferably glycerol carbonate. Glycerol carbonate could be also employed in combination with other aliphatic cyclic carbonates based on diols like ethylene carbonate or 1,2-propylene carbonate or 1,3-propylene carbonate. Preferably, the cyclic carbonate compound consists only of glycerol carbonate.

Glycerol is the preferred starter aliphatic alcohol ω. Preferably, glycerol is reacted with glycerol carbonate alone to obtain hyperbranched polyglycerol.

The aliphatic alcohol ω and the cyclic carbonate may be used in any desired ratios relative to one another. Preferably the ratio of moles of hydroxyl groups of aliphatic alcohol ω to moles of cyclic carbonate is usually in the range of 1:5 to 1:500, preferably in the range of 1:5 to 1:200, even more preferably, in the range of 1:5 to 1:100.

The final hyperbranched polyether polyol (compound A, prepared according to process i) b)) has a number-average molecular weight Mn determined by GPC from 400 g/mol to 20000 g/mol and a weight-average molecular weight Mw of from 2000 g/mol to 100000 g/mol. Preferred is Mw from 4000 to 40000 g/mol. The OH number is from 400 to 1000 mg KOH per g of polymer, preferrably from 500 to 850 mg KOH.

Core compound A can be prepared by reacting aliphatic alcohol ω of step i) b) with the cyclic carbonate in the presence of at least one base. The polymerization takes place as base-initiated ring-opening polycondensation. The base is therefore used as initiator.

Bases suitable for polymerization processes are known to the person skilled in the art, for example alkali metals, alkali metal hydrides, alkali metal hydroxides, alkali metal alcoholates or alkaline earth metals, alkaline earth metal hydrides, alkaline earth metal hydroxides or alkaline earth metal alcoholates and also tertiary and heteroaromatic amines can be used for this purpose.

All compounds known to the person skilled in the art can be used as alkali metal hydroxide or as alkaline earth metal hydroxide. Preferred alkali metal hydroxides are sodium hydroxide, potassium hydroxide or cesium hydroxide, preferred alkaline earth metal hydroxides are magnesium hydroxide or calcium hydroxide, preferred alkali metal alcoholates are sodium methanolate, sodium t-butylate and potassium methanolate, and also potassium t-butylate.

Preferred amines are trimethylamine, N,N-dimethylethanolamine and other N,N-dimethyl substituted tertiary amines, or imidazole and its derivatives.

Preferred bases are selected from KOH, KOCH$_3$, KO(t-Bu), KH, NaOH, NaO(t-Bu), NaOCH$_3$, NaH, Na, K, trimethylamine, N,N-dimethylethanolamine, N,N-dimethylcyclohexylamine and higher N,N-dimethylalkylamines, N,N-dimethylaniline, N,N-dimethylbenzylamine, N,N,N'N'-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole. Higher N,N-dimethylalkylamines are understood as meaning all amines whose alkyl substituent has more than 6 carbon atoms.

Particularly preferred bases are KO (t-Bu) (where t-Bu is the radical tertiary-butyl), KOH or NaOH.

The base is preferably used in amounts of from 0.05% by weight to 20% by weight, the base preferably being used in an amount of from 0.1 to 10% by weight, in particular from 0.1 to 1% by weight (in each case based on the amount of polymer (product)).

In a preferred embodiment of the present invention, the base is used in dissolved form. Solvents which can be used are all solvents known to the person skilled in the art in which the corresponding base dissolves. Preference is given to using water as solvent for the base, particularly in the case of alkali metal hydroxides. The base is preferably used in amounts of from 40 to 60% by weight (based on the solvent of the base).

The process according to the invention is carried out in temperature ranges for polymerization processes known to the person skilled in the art, preferably at elevated temperature, for example at 80 to 220° C., more preferably at 150 to 220° C., particularly preferably at 160 to 210° C.

The process according to the invention can also be carried out in the presence of a solvent. Solvents which can be used are all solvents for carrying out polymerization processes that are known to the person skilled in the art. Preferred solvents are toluene, xylene, tetrahydrofuran (THF) or dioxane. Preferably, the solvent is used in amounts of from 20 to 90% by weight, in particular from 30 to 70% by weight based on the total amount of aliphatic alcohol ω and cyclic carbonate.

In the process according to the invention, the polymerization is carried out as base-initiated ring-opening polycondensation and with the release of $CO_2$.

Step i) c): Preparation of an Aliphatic Hyperbranched Polyether Polyol (Core Compound A)

The aliphatic alcohol ω of step i) c) is the same alcohol as the aliphatic alcohol ω of step i) b). The aliphatic alcohol ω is preferably selected from the group consisting of glycerol, trimethylolethane, trimethylolpropane, 1,2,4-butanetriol, 1,2,3-hexanetriol, 1,2,4-hexanetriol, pentaerythritol or dipentaerythritol. Even more preferably, the trifunctional and higher-functionality alcohols are TMP or pentaerythritol.

The epoxide based on an aliphatic polyol having the general formula $[C_nH_{(2n+2)-x}OH_x][EO]_y[PO]_z$, wherein $3 \leq x \leq 6$, $0 \leq y \leq 20$, $0 \leq z \leq 20$ and $3 \leq n \leq 10$ may be a $C_3$-$C_{10}$ aliphatic monoalcohol monoepoxyde, in particular glycidol.

The epoxide with at least one free OH group could be optionally employed in combination with other epoxides without free hydroxyl groups like EO or PO.

The aliphatic alcohol ω and glycidol may be used in any desired ratios relative to one another. Preferably the ratio of moles of hydroxyl groups of aliphatic alcohol ω to moles of glycidol is usually in the range of 1:5 to 1:1000, preferably in the range of 1:5 to 1:500, even more preferably, in the range of 1:5 to 1:300.

The final hyperbranched polyether polyol (compound A, prepared according to process i) c)) has a number-average molecular weight Mn determined by GPC from 400 g/mol to 20000 g/mol and a weight-average molecular weight Mw of from 2000 g/mol to 100000 g/mol. Preferred is Mw from 2000 to 40000 g/mol. The OH number is from 400 to 1000 mg KOH per g of polymer, preferably from 500 to 850 mg KOH.

Core compound A can be prepared by reacting aliphatic alcohol ω with an epoxide based on an aliphatic polyol having the general formula $[C_nH_{(2n+2)-x}OH_x][EO]_y[PO]_z$, wherein $3 \leq x \leq 6$, $0 \leq y \leq 20$, $0 \leq z \leq 20$ and $3 \leq n \leq 10$ in the presence of at least one base or at least one acid as catalyst. The polymerization takes place as base-initiated or acid-initiated ring-opening polyaddition.

Suitable solvents, in particular amidated solvents, and reaction conditions used for the reaction of aliphatic alcohol ω with glycidol are described in DE 102 11 664 A1.

Suitable acid catalysts are, for example, acids with a $pK_a$ of less than 2.2; particular preference is given to strong acids. Particular preference is given, as inventive catalysts, to phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid or acidic ion exchangers. Very particular preference is given to methanesulfonic acid, trifluoromethanesulfonic acid, p-toluenesulfonic acid or acidic ion exchangers.

Bases suitable for polymerization processes are known to the person skilled in the art, for example alkali metals, alkali metal hydrides, alkali metal hydroxides, alkali metal alcoholates or alkaline earth metals, alkaline earth metal hydrides, alkaline earth metal hydroxides or alkaline earth metal alcoholates and also tertiary and heteroaromatic amines can be used for this purpose. Particularly preferred bases are KO (t-Bu) (where t-Bu is the radical tertiary-butyl), potassium (metal), KOH or NaOH.

Preferred core compound A obtained via step i)c) is polyglycerol.

The aliphatic hyperbranched polyether polyol core compound A in any of the above described preparation processes i) a), i) b) or i) c) has a number-average molecular weight Mn determined by GPC from 400 g/mol to 20000 g/mol and a weight-average molecular weight $M_w$ of from 2000 g/mol to 100000 g/mol. Preferred is $M_w$ from 2000 to 40000 g/mol. The OH number is from 400 to 1000 mg KOH per g of polymer, preferably from 500 to 850 mg KOH. Core compound A is preferably prepared via a polycondensation approach (i) (a).

Step ii): Preparation of Compound B

Compound B is typically obtainable by reacting the aliphatic hyperbranched polyether polyol (compound A) with ethylene oxide, or with ethylene oxide and glycidol, or with ethylene oxide and $C_3$-$C_{20}$ alkylene oxide, or with ethylene oxide, glycidol and $C_3$-$C_{20}$ alkylene oxide.

Preferably compound A is alkoxylated only with ethylene oxide and glycidol. Even more preferably compound A is alkoxylated only with ethylene oxide.

In another embodiment of the invention, compound A is alkoxylated with ethylene oxide and $C_3$-$C_{20}$ alkylene oxide, and optionally glycidol. Suitable $C_3$-$C_{20}$ alkylene oxides are propylene oxide, 1-butene oxide, 2-butene oxide, 1-pentene oxide, 1-hexene oxide, 1-heptene oxide, 1-octene oxide, 1-nonene oxide, 1-decene oxide, 1-undecene oxide or 1-dodecene oxide, and mixtures thereof. The preferred $C_3$-$C_{20}$ alkylene oxide is propylene oxide. Preferably the amount of ethylene oxide is at least 75 mol % based on the total number of moles of ethylene oxide and of $C_3$-$C_{20}$ alkylene oxide, more preferably the amount of ethylene oxide is at least 83 mol %, even more preferably the amount of ethylene oxide is at least 90 mol % based on the total number of moles of ethylene oxide and of $C_3$-$C_{20}$ alkylene oxide. If compound A is alkoxylated with ethylene oxide and $C_3$-$C_{20}$ alkylene oxide, the preferred configuration is a random distribution of ethylene oxide and $C_3$-$C_{20}$ alkylene oxide units within this segment of the side-chains/arms. However, block structures, multi-block structures or gradient copolymer segments within the ethylene oxide and the $C_3$-$C_{20}$ alkylene oxide units may be formed as well during the conversion of compound A to compound B, among them preferably blocks. Preferably ethylene oxide and $C_3$-$C_{20}$ alkylene oxide are mixed together and then reacted with compound A to lead to compound B. In another embodiment, ethylene oxide and $C_3$-$C_{20}$ alkylene oxide are fed separately: $C_3$-$C_{20}$ alkylene oxide is first reacted with compound A then ethylene oxide or ethylene oxide is first reacted with compound A then $C_3$-$C_{20}$ alkylene oxide.

Compound B preferably comprises at least three repeating units of ethylene oxide. Within the preferred structures, the poly(alkylene oxide) block consisting of ethylene oxide and optionally $C_3$-$C_{20}$ alkylene oxide is attached in such a way to compound A that all hydroxyl groups of the core compound A are reacted first with at least one ethylene oxide unit.

The mole ratio of the hydroxyl groups of compound A to the sum of all alkylene oxide units in compound B is usually in the range of 1:3 to 1:100, preferably in the range from 1:10 to 1:80 and especially from 1:20 to 1:60. The alkoxylation of compound A can be effected by the process according to the invention for preparing the amphiphile.

If both ethylene oxide and $C_3$-$C_{20}$ alkylene oxide are used during step ii), the molar ratio of ethylene oxide to $C_3$-$C_{20}$ alkylene oxide added in step ii) is usually 1000:1 to 3:1, preferably 1000:1 to 5:1, more preferably 1000:1 to 9:1.

Bases suitable for ethoxylation processes are known to the person skilled in the art, for example alkali metals, alkali metal hydrides, alkali metal hydroxides, alkali metal alcoholates or alkaline earth metals, alkaline earth metal hydrides, alkaline earth metal hydroxides or alkaline earth metal alcoholates and also tertiary and heteroaromatic amines can be used for this purpose.

Preferred bases are selected from KOH, KOCH$_3$, KO(t-Bu), KH, NaOH, NaO(t-Bu), NaOCH$_3$, NaH, Na, K, trimethylamine, N,N-dimethylethanolamine, N,N-dimethylcyclohexylamine and higher N,N-dimethylalkylamines, N,N-dimethylaniline, N,N-dimethylbenzylamine, N,N,N'N'-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole. Higher N,N-dimethylalkylamines are understood as meaning all amines whose alkyl substituent has more than 6 carbon atoms.

Particularly preferred bases are KO (t-Bu) (where t-Bu is the radical tertiary-butyl), KOH or NaOH. The catalysts used to prepare polyether alcohols are, however, also frequently multi-metal cyanide compounds or double metal cyanide catalysts, commonly also referred to as DMC catalysts. The use of DMC catalysts minimizes the content of unsaturated by-products, and the reaction also proceeds with a significantly higher space-time yield compared to the customary basic catalysts. The preparation and use of double metal cyanide complexes as alkoxylation catalysts has been known since the 1960s and is detailed, for example, in U.S. Pat. Nos. 3,427,256, 3,427,334, 3,427,335, 3,278,457, 3,278,458, 3,278,459. Among the ever more effective types of DMC catalysts which have been developed further in the subsequent years and are described, for example, in U.S. Pat. Nos. 5,470,813 and 5,482,908 are specifically zinc-cobalt hexacyano complexes. By virtue of their exceptionally high activity, only small catalyst concentrations are required to prepare polyetherols, such that it is possible to dispense with the workup stage needed for conventional alkaline catalysts (consisting of the neutralization, the precipitation and the filtering-off of the catalyst) at the end of the alkoxylation process. The alkoxylation products prepared with DMC catalysts are notable for a much narrower molar mass distribution compared to alkali-catalyzed products.

The process according to the invention is carried out in temperature ranges for polymerization processes known to the person skilled in the art, preferably at a temperature of from 80 to 200° C., even more preferably at a temperature of from 100 to 140° C.

As a result, compound B comprises in average at least three linear, polymerized ethylene oxide units per hydroxyl group. Preferably, at least one of the respective polyethylene oxide units is bonded directly to a respective hydroxyl group of the core compound A.

Step iii): Preparation of Compound C

Compound B is alkoxylated with C$_3$-C$_{20}$ alkylene oxide or with a mixture of ethylene oxide and C$_3$-C$_{20}$ alkylene oxide, preferably alkoxylated with C$_3$-C$_{20}$ alkylene oxide. Suitable C$_3$-C$_{20}$ alkylene oxides are propylene oxide, 1-butene oxide, 2-butene oxide, 1-pentene oxide, 1-hexene oxide, 1-heptene oxide, 1-octene oxide, 1-nonene oxide, 1-decene oxide, 1-undecene oxide or 1-dodecene oxide, and mixtures thereof. The preferred C$_3$-C$_{20}$ alkylene oxide is propylene oxide. The preferably obtained compound C therefore contains a PEO block (from preparation of compound B) and a PPO block (from preparation of compound C), so that compound C preferably has a diblock structure within its side-chains/arms.

In case that for preparation of compound C, mixtures of ethylene oxide and C$_3$-C$_{20}$ alkylene oxide are used, these mixtures preferably comprise at least 75 mol % of C$_3$-C$_{20}$ alkylene oxide, more preferably at least 83 mol % and especially at least 90 mol %, based in each case on the total number of moles of ethylene oxide and C$_3$-C$_{20}$ alkylene oxide in the mixture. The preferred C$_3$-C$_{20}$ alkylene oxide in the mixture is propylene oxide. If compound B is alkoxylated with a mixture of ethylene oxide and C$_3$-C$_{20}$ alkylene oxide, the preferred configuration is a random distribution of ethylene oxide and C$_3$-C$_{20}$ alkylene oxide units within this segment of the side-chains/arms. However, block structures, multi-block structures or gradient copolymer segments within the ethylene oxide and C$_3$-C$_{20}$ alkylene oxide units may be formed as well during the conversion of compound B to compound C, among them preferably blocks. When working with mixtures of ethylene oxide and C$_3$-C$_{20}$ alkylene oxide during preparation of compound C, the finally obtained compound C in a preferred embodiment therefore contains a PEO block (from preparation of compound B) and a PPO-stat-PEO block (from preparation of compound C), so that compound C has a more complex structure within its side-chains/arms.

In a further preferred embodiment, the compound C preferably comprises at least three repeating units of poly(C$_3$-C$_{20}$ alkylene oxide), the latter preferably being polypropylene oxide. The poly(C$_3$-C$_{20}$ alkylene oxide) block or the copolymer block of EO and C$_3$-C$_{20}$ alkylene oxide is especially preferably bonded directly to the compound B. Suitable C$_3$-C$_{20}$ alkylene oxides for the poly(C$_3$-C$_{20}$ alkylene oxide) are as described above. The preferred structures are obtainable by alkoxylating compound B with C$_3$-C$_{20}$ alkylene oxide, giving access to diblock structures PEO-b-PPO within the side-chains/arms, or by alkoxylating compound B with a mixture of C$_3$-C$_{20}$ alkylene oxide and ethylene oxide, giving access to PEO-b-(PPO-stat-PEO) segments in the side-chains/arms of the amphiphilic star-like polyether.

The mole ratio of the hydroxyl groups of compound B to the C$_3$-C$_{20}$ alkylene oxide units or to the sum of ethylene oxide and C$_3$-C$_{20}$ alkylene oxide units in compound C is usually in the range of 1:3 to 1:60, preferably in the range from 1:5 to 1:50 and especially from 1:10 to 1:40. The alkoxylation of compound B can be effected by the process according to the invention for preparing the amphiphile.

If mixtures of C$_3$-C$_{20}$ alkylene oxide and ethylene oxide are used during step iii), the molar ratio of C$_3$-C$_{20}$ alkylene oxide to ethylene oxide added in step iii) is usually 1000:1 to 3:1, preferably 1000:1 to 5:1, more preferably 1000:1 to 9:1.

The obtained compound C has a total ratio of ethylene oxide repeating units and optionally glycidol repeating units to C$_3$-C$_{20}$ alkylene oxide repeating units or ethylene oxide and C$_3$-C$_{20}$ alkylene oxide from 0.1:1 to 10:1, preferably 0.5:1 to 5:1 and even more preferred from 1:1 to 3:1. In a preferred embodiment, compound C has a ratio of ethylene oxide repeating units to propylene oxide repeating units from 1:1 to 3:1, preferably from 1.2:1 to 1.8:1.

The alkoxylated aliphatic hyperbranched polyetherol, i.e. compound C, is preferably water-soluble. This means that it is soluble in water at 20° C. to an extent of at least 2% by weight, preferably 8% by weight and especially to an extent of at least 15% by weight.

In a further embodiment, the alkoxylated aliphatic hyperbranched polyetherol, i.e. compound C, is usually water-dispersible. This means that it is dispersible in water at 20° C. to an extent of at least 2% by weight, preferably 8% by weight and especially to an extent of at least 15% by weight.

The alkoxylated aliphatic hyperbranched polyetherol usually has an OH number of 5 to 100 mg KOH per g of polymer, preferably of from 5 to 50 mg KOH per g of polymer.

The weight-average molecular weight $M_w$ of the star-like polyetherols (compound C) is usually from 5000 to 500000 g/mol, preferably from 10000 to 400000 g/mol, more preferably 20000 to 3000000 g/mol and even more preferably from 30000 to 250000 g/mol.

Step iv): Preparation of Compound D

When compound C is converted in one step in the presence of modifying reagents, a polyether polymer is obtained with functionalities other than the hydroxyl groups, selectively at the periphery (shell) of the macromolecule. Such a functionalization can be achieved, for example, by adding compounds which bear a group that reacts with the OH group of compound C and additionally bears an additional anionic functional group like sulfate, sulphonate, carboxylate, phosphate or phosphonate.

By modification of the shell of the macromolecule with anionic groups, the solubility of the final polymer D in water is significantly improved. Anionic modification also ensures the compatibility with the (predominantly) anionic surfactant matrix in a liquid laundry formulation.

It is possible, for example, to obtain polyethers comprising acid groups by reacting the OH groups with compounds comprising anhydride groups, e.g. succinic acid anhydride.

Other preferred reagents are chlorosulfonic acid, sulfur trioxide, chloroacetic acid, phosphoric acid, phosphonic acid.

Optionally compound C can be reacted with modification reagents to convert 5 to 100% of the terminal hydroxyl groups, preferably 30 to 100%, even more preferably 50 to 100% of the terminal hydroxyl groups to anionic sulphate, sulfonate, carboxylate, phosphate or phosphonate groups, leading to compound D.

The alkoxylated and functionalized aliphatic hyperbranched polyetherol (compound D) usually has an OH number of 5 to 100 mg KOH per g of polymer, preferably of from 5 to 50 mg KOH per g of polymer.

The weight-average molecular weight $M_w$ of the star-like polyetherols (compound D) is usually from 5000 to 500000 g/mol, preferably from 10000 to 400000 g/mol, more preferably 20000 to 3000000 g/mol and even more preferably from 30000 to 250000 g/mol.

The amphiphilic star-like polyether is manufactured by a process comprising the following steps:

A 3-step or 4-step process for the manufacture of an amphiphilic star-like polyether, characterised in i) step i: preparing an aliphatic hyperbranched polyether polyol (core compound A) either by
   a) reacting an aliphatic alcohol α having the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$ with itself and/or optionally with a di-, tri-, tetra- or higher functional aliphatic alcohol β having the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$, in the presence of a catalyst, and removing the water formed during the reaction (polycondensation approach i)a))
   or
   b) reacting an aliphatic alcohol ω having the general formula $[C_nH_{(2n+2)-x}OH_x][EO]y[PO]_z$, wherein $1 \leq x \leq 6$, $0 \leq y \leq 20$, $0 \leq z \leq 20$ and $1 \leq n \leq 10$ with a cyclic carbonate based on an aliphatic polyol having the general formula $[C_nH_{(2n+2)-x}OH_x][EO]y[PO]_z$, wherein $3 \leq x \leq 6$, $0 \leq y \leq 20$, $0 \leq z \leq 20$, and $3 \leq n \leq 10$, in the presence of a base as catalyst, and removing the carbon dioxide formed during the reaction (ring-opening polycondensation approach i)b))
   or
   c) reacting an aliphatic alcohol ω with the general formula $[C_nH_{(2n+2)-x}OH_x][EO]y[PO]_z$, wherein $1 \leq x \leq 6$, $0 \leq y \leq 20$, $0 \leq z \leq 20$ and $1 \leq n \leq 10$ with an epoxide based on an aliphatic polyol having the general formula $[C_nH_{(2n+2)-x}OH_x][EO]y[PO]_z$, wherein $3 \leq x \leq 6$, $0 \leq y \leq 20$, $0 \leq z \leq 20$ and $3 \leq n \leq 10$, in the presence of either a base or an acid as catalyst (ring-opening polyaddition approach i)c)), ii) step ii: reacting core compound A with ethylene oxide or with ethylene oxide and glycidol, or with ethylene oxide and $C_3$-$C_{20}$ alkylene oxide, or with ethylene oxide, glycidol and $C_3$-$C_{20}$ alkylene oxide, leading to compound B, iii) step iii: reacting compound B with a $C_3$-$C_{20}$ alkylene oxide or with a mixture of ethylene oxide and a $C_3$-$C_{20}$ alkylene oxide, leading to compound C, iv) optionally, step iv: reacting compound C with modification reagents to convert 5 to 100% of the terminal hydroxyl groups to anionic sulphate, sulfonate, carboxylate, phosphate or phosphonate groups, leading to compound D.

Formulations

The star-like polyether is used as an additive in detergents, especially as a dispersant, anti-redeposition agent and anti-greying agent, especially for anti-greying effect on cotton fabrics. The inventive polyether is typically used in laundry compositions at a concentration from 0.1-10 wt %, preferably from 0.5-5 wt %.

In addition to the polymer according to the invention, the washing or cleaning agent comprises surfactant(s), wherein anionic, non-ionic, zwitterionic and/or amphoteric surfactants can be employed.

Mixtures of anionic and non-ionic surfactants are preferred from the industrial application viewpoint. The total surfactant content of the liquid washing or cleaning agent is preferably below 60 wt % and particularly preferably below 45 wt %, based on the total liquid washing or cleaning agent. Suitable non-ionic surfactants include alkoxylated fatty alcohols, alkoxylated fatty acid alkyl esters, fatty acid amides, alkoxylated fatty acid amides, polyhydroxyfatty acid amides, alkylphenol polyglycol ethers, amine oxides, alkyl polyglucosides and mixtures thereof. Preferred non-ionic surfactants are alkoxylated, advantageously ethoxylated, particularly primary alcohols preferably containing 8 to 18 carbon atoms and, on average, 1 to 12 moles of ethylene oxide (EO) per mole of alcohol, in which the alcohol group may be linear or, preferably, methylbranched in the 2-position or may contain e.g. linear and methyl-branched groups in the form of the mixtures typically present in oxo alcohol groups. In particular, however, alcohol ethoxylates with linear alcohol groups of natural origin with 12 to 18 carbon atoms, for example from coco-, palm-, tallow or oleyl alcohol, and an average of 2 to 8 EO per mole alcohol are preferred. Exemplary preferred ethoxylated alcohols include C12-C14 alcohols with 3 EO, 4 EO or 7 EO, C9-C11 alcohols with 7 EO, C13-C15 alcohols with 3 EO, 5 EO, 7 EO or 8 EO, C12-C18 alcohols with 3 EO, 5 EO or 7 EO and mixtures thereof, such as mixtures of C12-C14 alcohol with 3 EO and 25 C12-C18 alcohol with 7 EO. The cited degrees of ethoxylation constitute statistically average values that can be a whole or a fractional number for a specific product. Preferred alcohol ethoxylates have a narrowed homolog distribution (narrow range ethoxylates, NRE). In addition to these non-ionic surfactants, fatty alcohols with more than 12 EO can also be used. Examples of these are tallow fatty alcohol with 14 EO, 25 EO, 30 EO or 40 EO. Also, non-ionic surfactants that comprise EO and PO groups together in the molecule are employable according to the invention. Further suitable is also a mixture of a (highly) branched ethoxylated fatty alcohol and a linear ethoxylated fatty alcohol, such as for example a mixture of a C16-C18 fatty alcohol with 7 EO and 2-propylheptanol with 7 EO. The washing, cleaning, post-treatment or auxiliary washing agent particularly preferably comprises a C12-C18 fatty alcohol with 7 EO or a C13-C15 oxoalcohol with 7 EO as the non-ionic surfactant. The content of non-ionic surfactants in the washing or cleaning agent is preferably 3 to 40 wt %, advantageously 5 to 30 wt % and particularly 7 to 20 wt %, in each case based on the total washing or cleaning agent.

In addition to the non-ionic surfactants, the washing or cleaning agent can also comprise anionic surfactants. Sulfonates, sulfates, ethersulfates, soaps, alkyl phosphates, anionic silico-surfactants and mixtures thereof are preferably employed as the anionic surfactant. Suitable surfactants of the sulfonate type are, advantageously C9-C13 alkylbenzene sulfonates, olefin sulfonates, i.e. mixtures of alkene- and hydroxyalkane sulfonates and disulfonates, as are obtained, for example, from C12-C18 monoolefins having a terminal or internal double band, by sulfonation with gaseous sulfur trioxide and subsequent alkaline or acidic hydrolysis of the sulfonation products. C12-C18 alkane sulfonates and the esters of α-sulfofatty acids (ester sulfonates), for example the α-sulfonated methyl esters of hydrogenated coco-, palm nut- or tallow acids are likewise suitable. Preferred alk(en)yl sulfates are the alkali metal and especially sodium salts of the sulfuric acid half-esters derived from the C12-C18 fatty alcohols, for example from coconut butter alcohol, tallow alcohol, lauryl, myristyl, cetyl or stearyl alcohol or from C10-C20 oxo alcohols and those half-esters of secondary alcohols of these chain lengths. The C12-C16 alkyl sulfates and C12-C15 alkyl sulfates as well as C14-C15 alkyl sulfates are preferred on the grounds of washing performance. 2,3-Alkyl sulfates are also suitable anionic surfactants. Sulfuric acid mono-esters derived from straight-chain or branched C7-C21 alcohols ethoxylated with 1 to 6 moles ethylene oxide are also suitable, for example 2-methyl-branched C9-C11 alcohols with an average of 3.5 mole ethylene oxide (EO) or C12-C18 fatty alcohols with 1 to 4 EO. A preferred alkylethersulfate is sodium laurylethersulfate with 2EO.

Soaps are also preferred anionic surfactants. Saturated and unsaturated fatty acid soaps are suitable, such as the salts of lauric acid, myristic acid, palmitic acid, stearic acid, (hydrogenated) erucic acid and behenic acid, and especially soap mixtures derived from natural fatty acids such as coconut oil fatty acid, palm kernel oil fatty acid, olive oil fatty acid or tallow fatty acid. The anionic surfactants, including the soaps, can be present in the form of their sodium, potassium or magnesium or ammonium salts. The anionic surfactants are preferably present in the form of their sodium salts Further preferred counter ions for the anionic surfactants are also the protonated forms of choline, triethylamine or methylethylamine.

The content of anionic surfactants in a washing or cleaning agent is 1 to 40 wt %, advantageously 5 to 30 wt % and quite particularly preferably 10 to 25 wt %, in each case based on the total washing or cleaning agent.

The inventive polymer is incorporated in liquid washing or cleaning agents, wherein the agents comprise water as the main solvent. In addition, non-aqueous solvents can be added to the washing or cleaning agent. Suitable non-aqueous solvents include mono- or polyhydric alcohols, alkanolamines or glycol ethers, in so far that they are miscible with water in the defined concentration range. The solvents are preferably selected from ethanol, n-propanol, i-propanol, butanols, glycol, propylene glycol, propane diol, butane diol, glycerin, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether as well as mixtures of these solvents. Non-aqueous solvents can be added to the washing or cleaning agent in amounts between 0.5 and 15 wt %, preferably, however below 12 wt %.

In addition to the inventive polymer and to the surfactant(s), the washing or cleaning agent can comprise additional ingredients that further improve the application technological and/or esthetic properties of the washing or cleaning agent. In the context of the present invention, the washing or cleaning agent preferably additionally comprises one or a plurality of substances from the group of the builders, bleaching agents, bleach catalysts, bleach activators, enzymes, electrolytes, non-aqueous solvents, pH adjustors, perfumes, perfume carriers, fluorescent agents, dyes, hydrotropes, foam inhibitors, silicone oils, soil-release polymers, additional graying inhibitors, shrink preventers, anticrease agents, color transfer inhibitors, antimicrobials, germicides, fungicides, antioxidants, preservatives, corrosion inhibitors, antistats, bittering agents, ironing aids, water-repellents and impregnation agents, swelling and nonskid agents, softening components and UV-absorbers.

EXAMPLES (SYNTHESIS OF POLYMERS, APPLICATION EXPERIMENTS)

Synthesis of Polymers

Example 1: Synthesis of Dendritic Polyether Core Molecule C.1

The polycondensation was performed in a 2 L glass flask equipped with a stirrer, reflux condenser and a distillation system with vacuum connection. A mixture of 675 g pentaerythritol, 745 g triethylene glycol (molar ratio pentaerythritol/triethylene glycol 1:1) and 2.2 g paratoluenesulfonic acid (catalyst) was evacuated and heated gradually to 185° C. by means of an oil bath at a pressure of 200-300 mbar. On attainment of the reaction temperature, the reaction mixture was stirred for 11 hours and the water formed in the reaction was distilled off. The distillate passing over was collected in a cooled round-bottom flask and weighed.

After the removal of 293 g water, the reaction mixture was cooled down in vacuo and neutralized by the addition of an aqueous potassium hydroxide solution. Finally, all volatile by-products were removed in vacuo and the obtained polyether core C.1, a yellowish, highly viscous liquid, was cooled down to room temperature.

Example 2: Synthesis of Dendritic Polyether Core Molecule C.2

The polycondensation was performed in a 4 L glass flask equipped with a stirrer, reflux condenser and a distillation system with vacuum connection. A mixture of 1225 g pentaerythritol, 1351 g triethylene glycol (molar ratio pentaerythritol/triethylene glycol 1:1) and 4.0 g paratoluenesulfonic acid (catalyst) was evacuated and heated gradually to 185° C. by means of an oil bath at a pressure of 200-300 mbar. On attainment of the reaction temperature, the reaction mixture was stirred for 11.5 hours and the water formed in the reaction was distilled off. The distillate passing over was collected in a cooled round-bottom flask and weighted.

After the removal of 555 g water, the reaction mixture was cooled down in vacuo and neutralized by the addition of an aqueous potassium hydroxide solution. Finally, all volatile by-products were removed in vacuo and the obtained polyether core C.2, a yellowish, highly viscous liquid, was cooled down to room temperature.

Example 3: Synthesis of Dendritic Polyether Core Molecule C.3

The polycondensation was performed in a 4 L glass flask equipped with a stirrer, reflux condenser and a distillation system with vacuum connection. A mixture of 1225 g pentaerythritol, 1351 g triethylene glycol (molar ratio pentaerythritol/triethylene glycol 1:1) and 4.0 g methanesulfonic acid (catalyst) was evacuated and heated gradually to 180° C. by means of an oil bath at a pressure of 200-300 mbar. On attainment of the reaction temperature, the reaction mixture was stirred for 6 hours and the water formed in the reaction was distilled off. The distillate passing over was collected in a cooled round-bottom flask and weighted.

After the removal of 478 g water, the reaction mixture was cooled down in vacuo and neutralized by the addition of an aqueous potassium hydroxide solution. Finally, all volatile by-products were removed in vacuo and the obtained polyether core C.3, a yellowish, highly viscous liquid, was cooled down to room temperature.

Example 4: Synthesis of Dendritic Polyether Core Molecule C.4

To 4.6 g of glycerol 280 mg potassium tert-butoxide were added and heated to 170° C. under stirring. On attainment of the reaction temperature, 164 g of glycerol carbonate (90% by weight) were added during a period of 8 hours. Upon completion of the addition, the mixture was stirred for further 2 hours at 170° C. Thereafter, the reaction mixture was cooled down to 80° C. and neutralized with acetic acid. Finally, 97 g of the polyether core C.3 were obtained as a brownish, highly viscous liquid.

Example 5: Synthesis of Star-Like Polyether S.1

In a 2 L reactor equipped with a heating system, cooling coil, agitator and vacuum connection 50.0 g polyether core C.1 and 4.8 g of an aqueous solution of KOH (50% by weight) were charged at a temperature of 110° C. Water was removed in vacuo (<20 mbar). After purging with nitrogen the mixture was heated to 130° C. and 612 g ethylene oxide were added during a period of 12 hours. Subsequently 539 g propylene oxide were added during a period of 5 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1225 g of the star-like polyether S.1 were obtained as a brownish, highly viscous liquid.

Example 6: Synthesis of Star-Like Polyether S.2

In a 2 L reactor equipped with a heating system, cooling coil, agitator and vacuum connection 25.0 g polyether core C.1 and 1.6 g potassium tert-butoxide were charged at a temperature of 80° C. After purging with nitrogen the mixture was heated to 130° C. and 612 g ethylene oxide were added during a period of 12 hours. Subsequently 538 g propylene oxide was added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1190 g of the star-like polyether S.2 were obtained as a yellowish, highly viscous liquid.

Example 7: Synthesis of Star-Like Polyether S.3

In a 2 L reactor equipped with a heating system, cooling coil, agitator and vacuum connection 56.0 g polyether core C.1 and 3.7 g potassium tert-butoxide were charged at a temperature of 80° C. After purging with nitrogen the mixture was heated to 120° C. and 1032 g ethylene oxide were added during a period of 12 hours. Upon completion of the addition, the reaction mixture was reacted for further 2 hours at 120° C. Thereafter, the reaction mixture was cooled down to 80° C. and all volatile by-products and residual monomers were removed in vacuo. 1077 g of the polyether ethoxylate were obtained as a brownish, highly viscous liquid.

542 g of the polyether ethoxylate were then charged in another 2 L reactor equipped with a heating system, cooling coil, agitator and vacuum connection. After purging with nitrogen the mixture was heated to 130° C. and 452 g propylene oxide were added during a period of 5 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1011 g of the star-like polyether S.3 were obtained as a brownish, highly viscous liquid.

Example 8: Synthesis of Star-Like Polyether S.4

In a 2 L reactor equipped with a heating system, cooling coil, agitator and vacuum connection 56.0 g polyether core C.1 and 3.7 g potassium tert-butoxide were charged at a temperature of 80° C. After purging with nitrogen the mixture was heated to 120° C. and 1032 g ethylene oxide were added during a period of 5 hours. Upon completion of the addition, the reaction mixture was reacted for further 10 hours at 120° C. Thereafter, the reaction mixture was cooled down to 80° C. and all volatile by-products and residual monomers were removed in vacuo. 1077 g of the polyether ethoxylate were obtained as a brownish, highly viscous liquid.

100 g of the polyether ethoxylate and 2.6 g potassium tert-butoxide were then charged in another 2 L reactor equipped with a heating system, cooling coil, agitator and vacuum connection at 80° C. After purging with nitrogen the mixture was heated to 130° C. and 95 g ethylene oxide were added during a period of 3 hours. Subsequently 167 g propylene oxide were added during a period of 5 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 363 g of the star-like polyether S.4 were obtained as a brownish, highly viscous liquid.

Example 9: Synthesis of Star-Like Polyether S.5

In a 2 L reactor equipped with a heating system, cooling coil, agitator and vacuum connection 50.0 g polyether core C.2 and 2.8 g potassium tert-butoxide were charged at a temperature of 80° C. After purging with nitrogen the mixture was heated to 130° C. and 528 g ethylene oxide were added during a period of 12 hours. Subsequently 464 g propylene oxide were added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1042 g of the star-like polyether S.5 were obtained as a yellowish, highly viscous liquid.

Example 10: Synthesis of Star-Like Polyether S.6

In a 2 L reactor equipped with a heating system, cooling coil, agitator and vacuum connection 25.0 g polyether core C.2 and 2.7 g potassium tert-butoxide were charged at a temperature of 80° C. After purging with nitrogen the mixture was heated to 130° C. and 530 g ethylene oxide were added during a period of 12 hours. Subsequently 464 g propylene oxide were added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1021 g of the star-like polyether S.6 were obtained as a yellowish, highly viscous liquid.

Example 11: Synthesis of Star-Like Polyether S.7

In a 2 L reactor equipped with a heating system, cooling coil, agitator and vacuum connection 30.0 g polyether core C.4 and 100 mg potassium tert-butoxide were charged at a temperature of 80° C. After purging with nitrogen the mixture was heated to 130° C. and 455 g ethylene oxide were added during a period of 12 hours. Subsequently 400 g propylene oxide were added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 889 g of the star-like polyether S.7 were obtained as a yellowish, highly viscous liquid.

Example 12. Synthesis of Star-Like Polyether S.8

In a 2 L reactor equipped with a heating system, cooling coil, agitator and vacuum connection 40.9 g polyether core C.3 and 3.8 g potassium tert-butoxide were charged at a temperature of 80° C. After purging with nitrogen the mixture was heated to 130° C. and 792 g ethylene oxide were added during a period of 12 hours. Subsequently 397 g propylene oxide were added during a period of 12 hours. Upon completion of the addition, the reaction mixture was reacted for further 10 hours at 130° C. Thereafter, the reaction mixture was cooled down to 80° C. and all volatile by-products and residual monomers were removed in vacuo. Finally, 1544 g of the star-like polyether S.8 were obtained as a brown solid.

Example 13: Synthesis of Star-Like Polyether S.9

In a 2 L reactor equipped with a heating system, cooling coil, agitator and vacuum connection 30.0 g polyether core C.3 and 2.12 g potassium tert-butoxide were charged at a temperature of 80° C. After purging with nitrogen the mixture was heated to 130° C. and 548 g ethylene oxide were added during a period of 6 hours. Subsequently 482 g propylene oxide were added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 1088 g of the star-like polyether S.9 were obtained as a yellowish, highly viscous liquid.

Example 14: Synthesis of Star-Like Polyether S.10 by Acid Functionalization of Star-Like Polyether S.9

In a 250 ml reactor equipped with a heating system, a stirrer and a reflux condenser 47 g star-like polyether S.8 and 0.8 g of succinic acid anhydride (SAA) were charged at a temperature of 25° C. After purging with nitrogen the mixture was heated slowly to 100° C., afterwards the reaction mixture was reacted for further 4 hours at 120° C. Finally, 49 g of the acid functionalized star-like polyether S.10 were obtained as a yellowish, highly viscous liquid.

Example 15: Synthesis of Star-Like Polyether S.11 by Acid Functionalization of Star-Like Polyether S.9

In a 250 ml reactor equipped with a heating system, a stirrer and a reflux condenser 48 g star-like polyether S.8 and 1.6 g of succinic acid anhydride (SAA) were charged at a temperature of 25° C. After purging with nitrogen the mixture was heated slowly to 100° C., afterwards the reaction mixture was reacted for further 4 hours at 120° C. Finally, 49 g of the acid functionalized star-like polyether S.11 were obtained as a yellowish, highly viscous liquid.

Example 16: Synthesis of Star-Like Polyether S.12

In a 2 L reactor equipped with a heating system, cooling coil, agitator and vacuum connection 40.0 g polyether core C.1 and 2.6 g potassium tert-butoxide were charged at a temperature of 80° C. After purging with nitrogen the mixture was heated to 130° C. and 489 g ethylene oxide were added during a period of 12 hours. Upon completion of the addition, the reaction mixture was reacted for further 6 hours at 130° C. Thereafter, the reaction mixture was cooled down to 80° C. and all volatile by-products and residual monomers were removed in vacuo. Finally, 544 g of the star-like polyether S.12 were obtained as a yellowish solid.

Example 17: Synthesis of Star-Like Polyether S.13

In a 2 L reactor equipped with a heating system, cooling coil, agitator and vacuum connection 50.0 g polyether core C.1 and 3.25 g potassium tert-butoxide were charged at a temperature of 80° C. After purging with nitrogen the mixture was heated to 130° C. and 539 g propylene oxide were added during a period of 6 hours. Upon completion of the addition, the reaction mixture was reacted for further 6 hours at 130° C. Thereafter, the reaction mixture was cooled down to 80° C. and all volatile by-products and residual monomers were removed in vacuo. Finally, 615 g of the star-like polyether S.13 were obtained as a brown solid.

Example 18: Synthesis of Star-Like Polyether S.14

In a 2 L reactor equipped with a heating system, cooling coil, agitator and vacuum connection 40.0 g polyether core C.1 and 2.6 g potassium tert-butoxide were charged at a temperature of 80° C. After purging with nitrogen the mixture was heated to 130° C. and 430 g propylene oxide were added during a period of 12 hours. Subsequently 489 g ethylene oxide were added during a period of 6 hours. Upon completion of the addition, the reaction mixture was reacted for further 12 hours at 130° C. Thereafter, the reaction mixture was cooled down to 80° C. and all volatile by-products and residual monomers were removed in vacuo. Finally, 982 g of the star-like polyether S.14 were obtained as a orange, highly viscous liquid.

Characterization of Polymers

Molecular weights and molecular weight distribution were analyzed by gel permeation chromatography with a refractometer as a detector. The mobile phase used was hexafluoroisopropanol (HFIP), the standard used to determine the molecular weight was poly(methyl methacrylate) (PMMA). The OH number (mg KOH/g) was determined to DIN 53240, Part 2.

Analytical data of the polymers (star-like polyether according to the present invention and starting materials for their preparation) are summarized in table 1.

TABLE 1

Composition and physicochemical characterization of star-like polyether

| Polymer | Dendritic polyether core | Chemistry dendritic core | $M_n$ (Dendritic core) [g/mol] | $M_w$ (Dendritic core) [g/mol] | OH number (Dendritic core) [mg KOH/g] | Linear inner block | Linear outer block | End-group funct. [%] |
|---|---|---|---|---|---|---|---|---|
| S.1  | C.1 | TEG/PE 1:1  | 630  | 5.490  | 650 | 24 EO | 16 PO | — |
| S.2  | C.1 | TEG/PE 1:1  | 630  | 5.490  | 650 | 48 EO | 32 PO | — |
| S.3  | C.1 | TEG/PE 1:1  | 630  | 5.490  | 650 | 36 EO | 24 PO | — |
| S.4  | C.1 | TEG/PE 1:1  | 630  | 5.490  | 650 | 72 EO | 48 PO | — |
| S.5  | C.2 | TEG/PE 1:1  | 900  | 11.300 | 563 | 24 EO | 16 PO | — |
| S.6  | C.2 | TEG/PE 1:1  | 900  | 11.300 | 563 | 48 EO | 32 PO | — |
| S.7  | C.4 | Polyglycerol| 510  | 13110  | 806 | 24 EO | 16 PO | — |
| S.8  | C.3 | TEG/PE 1:1  | 1000 | 23000  | 460 | 54 EO | 36 PO | — |
| S.9  | C.3 | TEG/PE 1:1  | 1000 | 23000  | 460 | 48 EO | 32 PO | — |
| S.10 | C.3 | TEG/PE 1:1  | 1000 | 23000  | 460 | 48 EO | 32 PO | SAA (40) |
| S.11 | C.3 | TEG/PE 1:1  | 1000 | 23000  | 460 | 48 EO | 32 PO | SAA (80) |
| S.12 | C.1 | TEG/PE 1:1  | 630  | 5.490  | 650 | 24 EO | —     | — |
| S.13 | C.1 | TEG/PE 1:1  | 630  | 5.490  | 650 | 16 PO | —     | — |
| S.14 | C.1 | TEG/PE 1:1  | 630  | 5.490  | 650 | 16 PO | 24 EO | — |
| C.1  | —   | TEG/PE 1:1  | 630  | 5.490  | 650 | —     | —     | — |
| C.2  | —   | TEG/PE 1:1  | 900  | 11.300 | 563 | —     | —     | — |
| C.3  | —   | TEG/PE 1:1  | 1000 | 23000  | 460 | —     | —     | — |
| C.4  | —   | Polyglycerol| 510  | 13110  | 806 | —     | —     | — |

Application Experiments:

Use of Star-Like Polymers According to the Invention in Detergents:

The secondary detergency of the star-like polymers according to the invention was determined. For the washing experiments, 2 liquid detergent formulations (F.1, F.2) were used, the composition of which is given in table 2. The washing conditions are listed in table 3.

TABLE 2

Composition of liquid detergent formulations

| Ingredients | F.1 [% active] | F.2 [% active] |
|---|---|---|
| Alkylbenzene sulfonic acid (C10-C13) | 7.5 | 5 |
| Sodium lauryl ether sulfate, 2 moles ethylene oxide | — | 6 |
| C13-C15 Oxoalcohol reacted with 7 moles of ethylene oxide | 7.5 | 5 |
| Potassium coconut soap | 2.55 | — |
| Potassium hydroxide | 1 | — |
| C12-C18 Fatty acid, sodium salt | — | 3 |
| Sodium hydroxide | — | 2 |
| Citric acid monohydrate | 1 | 2 |
| Diethylentriamine penta (methylene phosphonic acid) | 0.2 | 0.2 |
| Water | to 100 | to 100 |
| pH value | 8.5 | 8 |

TABLE 3

Washing conditions for evaluation of secondary detergency
Washing conditions

| | |
|---|---|
| Device | Launder-O-Meter+ from SDL Atlas, Rock Hill, USA |
| Washing liquor | 250 mL |
| Washing time | 20 minutes |
| Washing temperature | 40° C. |
| Detergent concentration | 5.0 g/L |
| Water hardness | 2.5 mmol/L; Ca:Mg:HCO3 4:1:8 |
| Fabric to liquor ratio | 1:10 |
| Washing cycles* | 3 |
| Star-like polyether addition | 3% by weight, based on the respective liquid detergent formulation |
| Test fabric | 3 different cotton test fabrics: 3.8 g WFK 12A (cotton terry cloth), 1.5 g WFK 80A (cotton knit) (fabrics from WFK Testgewebe GmbH, Brueggen, Germany), 2.0 g EMPA 221 (cotton fabric, cretonne, bleached, without optical brightener; EMPA Testmaterials, St. Gallen, Switzerland) |
| Soiled fabric** | 2.5 g EMPA 101 (carbon black/olive oil on cotton; EMPA Testmaterials, St. Gallen, Switzerland) + 2.5 g SBL 2004 (Soil Ballast Fabric 'Formula 2004' that simulates sebum grease stains; WFK Testgewebe GmbH, Brueggen, Germany) |
| Ballast fabric | 3 different synthetic test fabrics: 1.7 g WFK20A (polyester 65%, cotton 35%), 1.7 g WFK30A (polyester), 1.25 g EMPA 406 (polyamide 6.6 spun, type 200, plain weave, ISO 105-F03); and 2 different cotton fabrics: 1.8 g WFK 10A (standard cotton), and 1.6 g T-Shirt (Kapart brand, Brantic, Steisslingen) |

*After the 3 cycles, test fabrics are rinsed in water, followed by drying at ambient room temperature overnight
**New ballast soil is used for each cycle To determine the secondary detergency, the greying of the 3 white cotton test fabrics was measured by determining the degree of whiteness (reflectance values) after washing using a sphere reflectance spectrometer (SF 500 type from Datacolor, USA, wavelength range 360-700 nm, optical geometry)d/8° with a UV cutoff filter at 460 nm.

The difference between the reflectance after wash (R1) with the respective inventive polymer and the reflectance after wash (R2) without polymer (delta reflectance) is summarized in table 4.

A value $\Delta R$ (=R1−R2)>0 shows a positive contribution of the polymer to the anti-greying performance of the formulation, and therefore a positive anti-greying effect. If $\Delta R$ is >2, the improved whiteness compared to the fabrics washed without additive, is clearly visible.

TABLE 4

Results from launder-O-meter washing tests

| Detergent | Star-like polyether additive (3% by weight) | Cotton WFK 12A Delta Reflectance in % | Cotton WFK 80A Delta Reflectance in % | EMPA221 Delta Reflectance in % |
|---|---|---|---|---|
| F.1 | without star-like polyether | 0 | 0 | 0 |
| F.1 | C.1 | −1.1 | 0.5 | 0.2 |
| F.1 | S.1 | 5.3 | 5.3 | 5.6 |
| F.1 | S.2 | 13.8 | 9.9 | 11.9 |
| F.1 | S.3 | 9.6 | 8.3 | 9.2 |
| F.1 | S.4 | 7.6 | 9.8 | 9.6 |
| F.1 | S.12 | 0.9 | −0.5 | −3.5 |
| F.1 | S.13 | n.d.* | n.d.* | n.d.* |
| F.1 | S.14 | 0.1 | 1.8 | −2.6 |
| F.1 | C.2 | 1.1 | −1.1 | −0.5 |
| F.1 | S.5 | 8.5 | 7.8 | 8.6 |
| F.1 | S.6 | 9.2 | 9 | 9.5 |
| F.1 | C.3 | −0.4 | 0.1 | 0.9 |
| F.1 | S.8 | 11.3 | 12.2 | 11.6 |
| F.1 | S.9 | 12.8 | 11.3 | 10.9 |
| F.1 | C.4 | −0.4 | −1.6 | 2.2 |
| F.1 | S.7 | 4.7 | 3.3 | 3.5 |
| F.2 | without star-like polyether | 0 | 0 | 0 |
| F.2 | S.1 | 4.2 | 2.3 | 2.6 |
| F.2 | S.2 | 10.1 | 7.5 | 14.4 |
| F.2 | S.5 | 8.8 | 6.5 | 7 |
| F.2 | S.6 | 9.4 | 5.3 | 10.3 |
| F.2 | S.8 | 9.4 | 7.2 | 7.7 |
| F.2 | S.9 | 11.8 | 9.3 | 9.8 |
| F.2 | S.10 | 8.1 | 3.9 | 6.5 |
| F.2 | S.11 | 4.8 | 3.2 | 2.8 |

*n.d.: not determined due to insolubility of polymer in water

Liquid detergents comprising 2% by weight of the polyethers given in table 5, made by substituting 2% by weight of water in liquid detergent formulation F.2 by one of the polyethers, were used in a washing machine Miele® W 1714 (cotton wash program at 40° C., water with a hardness of 17° dH, standardized soil addition, 70 g of detergent per wash cycle) to treat unsoiled cotton textile samples (8 rectangular pieces with a sides of 20 cm and 40 cm), also given in table 5, in addition to clean fabrics to give washloads of 3.5 kg each. After 3 wash cycles the change of whiteness (Y) of the textile samples was compared to the change of whiteness of the textile samples washed 3 times under the same conditions with detergent F.2, comprising no star-like polyether. Table 5 gives the deltadeltaY-values in % thus obtained.

TABLE 5

Results from washing machine tests

| Polyether | WFK 10A | WFK 12A | Terry towel | Krefeld standard | Double rib | EMPA 221 |
|---|---|---|---|---|---|---|
| S.2 | 3.8 | 6.1 | 2.6 | 5.2 | 6.5 | 5.1 |
| S.6 | 4.0 | 3.2 | 2.7 | 5.1 | 5.3 | 4.0 |
| S.9 | 2.6 | 6.4 | 1.9 | 4.4 | 6.3 | 5.2 |

To ascertain the stability of the copolymers in various liquid detergent formulations, in each case 1.5% by weight of star-like polyether was formulated into the liquid detergent, and a visual assessment with regard to phase separation, clouding, incompatibilities, etc. was undertaken.

The stability tests were carried out with liquid detergent formulation F.1 and F.2. Table 5 summarizes the visual assessments after storage for 2 weeks at 37° C. While a clear solution was obtained with the star-like polyether additive in both formulations, precipitation or phase-separation occurred in both F.1 and F.2 when adding CMC

TABLE 6

Stability tests.

| Additive | Formulation | Visual assesment | Viscosity observation |
|---|---|---|---|
| S.3 | F1 | 1 | A |
| CMC* | F1 | 3 | C |
| CMC* | F2 | 3 | C |

*CMC, Carboxymethylcellulose Dow Cellulosics (Walocel CRT2000PA)
1: clearly soluble
2: soluble, cloudy
3: soluble, but phase separation
4: partly soluble, insoluble parts
5: completely insoluble
A: no effect on viscosity
B: slight increase of viscosity
C: strong increase of viscosity, gelation

The invention claimed is:

1. An amphiphilic polyether obtainable by the process of:
i) step i: preparation of an aliphatic hyperbranched polyether polyol (core compound A) by one of
   a) reacting an aliphatic alcohol α with the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$ with a di-, tri-, tetra- or higher functional aliphatic alcohol β with the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$, in the presence of a catalyst, and removing the water formed during the reaction (polycondensation approach i)a)); and
   b) reacting an aliphatic alcohol ω with the general formula $[C_nH_{(2n+2)-x}OH_x][EO]_y[PO]_z$, wherein $1 \leq x \leq 6$, $0 \leq y \leq 20$, $0 \leq z \leq 20$ and $1 \leq n \leq 10$ with at least one cyclic carbonate based on an aliphatic polyol with the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$, in the presence of a base as catalyst, and removing the carbon dioxide formed during the reaction (ring-opening polycondensation approach i)b)); and
ii) step ii: reacting core compound A with ethylene oxide only, leading to compound B, and
iii) step iii: reacting compound B with a $C_3$-$C_{20}$ alkylene oxide only, leading to compound C, and
iv) optionally, step iv: reacting compound C with a modifying reagent to convert 5 to 100% of the terminal hydroxyl groups to anionic sulphate, sulfonate, carboxylate, phosphate or phosphonate groups, leading to compound D.

2. The amphiphilic polyether according to claim 1, wherein the aliphatic alcohol α or ω is selected from the group consisting of glycerol, trimethylolethane, trimethylolpropane, 1,2,4-butanetriol, 1,2,3-hexanetriol, 1,2,4-hexanetriol, pentaerythritol and dipentaerythritol.

3. The amphiphilic polyether according to claim 1, wherein in the polycondensation approach i)a), the aliphatic alcohol α is pentaerythritol and pentaerythritol is reacted with at least one additional di-, tri-, tetra- or higher functional aliphatic alcohol β having the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$.

4. The amphiphilic polyether according to claim 1, wherein the aliphatic alcohol ω is glycerol.

5. The amphiphilic polyether according to claim 1, wherein in the polycondensation approach i)a), the additional di-, tri-, tetra- or higher functional aliphatic alcohol β is an ethoxylated ethylene glycol.

6. The amphiphilic polyether according to claim 1, wherein in the polycondensation approach i)a), the additional di-, tri-, tetra- or higher functional aliphatic alcohol β is triethylene glycol.

7. The amphiphilic polyether according to claim 1, wherein in the ring-opening polycondensation approach i) b), the cyclic carbonate based on an aliphatic polyol having the general formula $[C_nH_{(2n+2)-x}OH_x][EO]_y[PO]_z$, wherein $3 \leq x \leq 6$, $0 \leq y \leq 20$, $0 \leq z \leq 20$ and $3 \leq n \leq 10$ is glycerol carbonate.

8. The amphiphilic polyether according to claim 1, wherein core compound A has an OH number of from 400 to 1000 mg KOH per g of polymer and a weight-average molecular weight (Mw) of from 2000 g/mol to 100000 g/mol.

9. The amphiphilic polyether according to claim 1, wherein in step iii the $C_3$-$C_{20}$ alkylene oxide is propylene oxide.

10. The amphiphilic polyether according to claim 1, wherein in step ii, 1 mole of hydroxyl groups of core compound A is reacted with at least 3 moles ethylene oxide molecules, and in step iii 1 mole of hydroxyl groups of compound B is reacted with at least 3 moles propylene oxide molecules.

11. The amphiphilic polyether according to claim 1, further comprising step iv wherein compound D contains terminal sulphate groups.

12. An additive for use in laundry detergents, the additive comprising the amphiphilic polyether according to claim 1.

13. A dispersant for hydrophobic soil, the dispersant comprising the amphiphilic polyether according to claim 1.

14. An agent for anti-redeposition or anti-greying, the agent comprising the amphiphilic polyether according to claim 1.

15. Laundry compositions containing the amphiphilic polyether of claim 1.

16. Liquid laundry compositions comprising water, 0.1-60 wt % surfactants, and 0.1-10 wt % amphiphilic polyether according to claim 1.

17. A process for the manufacture of an amphiphilic polyether, the process comprising:
i) step i: preparing an aliphatic hyperbranched polyether polyol (core compound A) by one of:
   a) reacting an aliphatic alcohol α having the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$ with a di-, tri-, tetra- or higher functional aliphatic alcohol β having the general formula $[C_nH_{(2n+2)-x}OH_x][EO]_y[PO]_z$, wherein $2 \leq x \leq 8$, $0 \leq y \leq 20$, $0 \leq z \leq 20$, $2 \leq n \leq 10$, in the presence of a catalyst, and removing the water formed during the reaction (polycondensation approach i)a)); and
   b) reacting an aliphatic alcohol ω having the general formula $[C_nH_{(2n+2)-x}OH_x][EO]_y[PO]_z$, wherein $1 \leq x \leq 6$, $0 \leq y \leq 20$, $0 \leq z \leq 20$ and $1 \leq n \leq 10$ with a cyclic carbonate based on an aliphatic polyol having the general formula $[C_nH_{(2n+2)-x}OH_x][EO]_y[PO]_z$, wherein $3 \leq x \leq 6$, $0 \leq y \leq 20$, $0 \leq z \leq 20$, and $3 \leq n \leq 10$, in the presence of a base as catalyst, and removing the carbon dioxide formed during the reaction (ring-opening polycondensation approach i)b)),
ii) step ii: reacting core compound A with ethylene oxide only, leading to compound B, and
iii) step iii: reacting compound B with a $C_3$-$C_{20}$ alkylene oxide only, leading to compound C, and
iv) optionally, step iv: reacting compound C with a modifying reagent to convert 5 to 100% of the terminal hydroxyl groups to anionic sulphate, sulfonate, carboxylate, phosphate or phosphonate groups, leading to compound D.

* * * * *